July 4, 1961 M. WELSTEIN 2,991,202

MOULDS FOR THE PRODUCTION OF SLABS OF SUGAR

Filed Sept. 2, 1958 3 Sheets-Sheet 1

Inventor
Michel Welstein
By
Wenderoth, Lind & Ponack
Attorneys

MOULDS FOR THE PRODUCTION OF SLABS OF SUGAR

Filed Sept. 2, 1958 3 Sheets-Sheet 2

Inventor
Michel Welstein
By
Wenderoth, Lind & Ponack
Attorneys

MOULDS FOR THE PRODUCTION OF SLABS OF SUGAR

Filed Sept. 2, 1958 3 Sheets-Sheet 3

Inventor
Michel Welstein
By
Wenderoth, Lind & Ponack
Attorneys

United States Patent Office 2,991,202

Patented July 4, 1961

2,991,202

MOULDS FOR THE PRODUCTION OF SLABS OF SUGAR

Michel Welstein, Tirlemont, Belgium, assignor to Raffinerie Tirlemontoise, Tirlemont, Belgium, a Belgian company Filed Sept. 2, 1958, Ser. No. 758,508
Claims priority, application Belgium Nov. 21, 1957
5 Claims. (Cl. 127—18)

The present invention relates to a mould for the production of slabs of sugar cast according to the Adant process, such mould comprising a certain number of groups of plates regularly spaced one from another between which solidifies, by cooling, the boiled mass of sugar, each group being separated from the next by an upright in such manner that a group of plates and an adjacent half of each neighbouring upright forms an ensemble which can be enclosed by two portions of coaxial cylindrical or conical surfaces, limited by two diametral planes, all the plates of a group being substantially parallel with one another and to the axis of the cylindrical or conical surfaces, the plates and the uprights being limited, in two planes perpendicular to the axis, by rings.

In known moulds of this kind, the rings have grooves which maintain the plates in place; the removal from the mould is done by hand, after having dismounted the upper part and displaced certain uprights. Accordingly, upon the removal of the slabs of sugar formed between the plates, the latter are placed in another empty mould. The manual operations in effecting removal from the mould are numerous and involve the employment of a number of people. Moreover, the known moulds are not well adapted for mechanical emptying.

In order to remedy this drawback, the mould according to the present invention is designed to permit the extraction of the slabs of sugar in a greatly simplified manner.

For this purpose, each group of plates contains a number of plates equal to the number of slabs of sugar, plus one, in such manner that between an extreme slab of sugar and the adjacent upright there is situated a terminal plate forming a partition, the plates of each group being mounted between supports, the ensemble constituted by the plates of a group and their supports forming a whole in the form of a set designed to be able to be removed and re-introduced into a corresponding lodgment formed between the rings and the uprights related to the group of plates in question, these rings being fixed to the different uprights in such manner as, with the latter, to delimit a number of lodgments equal to the number of groups of plates, each set being able to slide in its lodgment in a substantially radial direction. In this way, the removal of the sets can be effected by a pressure exerted from the interior of the mould and, during the removal, it is the walls delimiting the set which slide against the walls delimiting the corresponding lodgment, even when the set contains slabs of sugar.

In one advantageous arrangement, the plates are mounted in movable fashion between the said supports. Each plate carries at least one tenon which is engaged in a hole in a support, when a plate is mounted between its supports. In this manner, the pressure necessary for removing the set from its lodgment can be applied solely against the supports and the plates are forced to follow, through the intermediary of the tenons.

The assemblage of a set is effected entirely freely and without the aid of any screw devices. By this means, all that is necessary, after removal of a set in order to liberate the plates so as to be able to take away the slabs of sugar, is to lift the upper support. This lends itself very well to mechanical operation.

In one particular arrangement, for reasons of filling the mould with the liquid mass, holes corresponding to the above mentioned holes in the supports, are formed in the said rings, each of the aforesaid tenons leaving free a part of the hole in which it is engaged, in such manner that the liquid mass can penetrate between the said plates by way of the many holes.

Other details and particulars of the invention will appear from the description of the drawings annexed to the present specification and which represent, by way of non-limitative example, one particular arrangement in accordance with the invention.

In the different figures, the same references designate identical elements.

Figure 1:
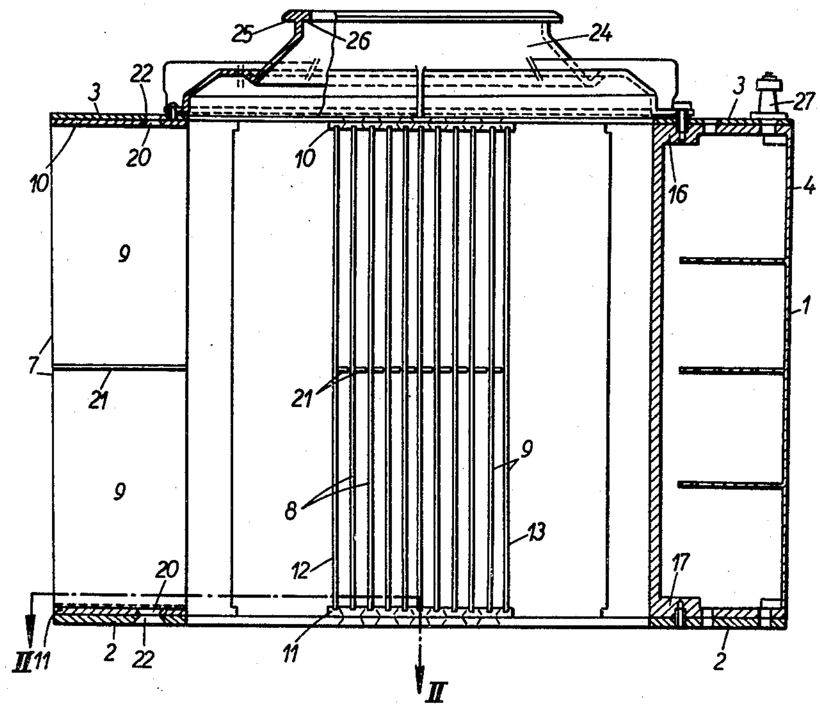
FIGURE 1 is a sectional elevation, the section being taken on the line I—I of FIGURE 2, of a mould according to the invention.

The mould illustrated comprises eight posts 1 mounted between two rings 2 and 3 which, contrary to what is done in known moulds, are not formed with grooves. The rings 2 and 3 are fixed to the posts 1. The latter are vertical and their transverse section is bounded, on the one hand by a partition, such as 4, of an even surface slightly conical, and on the other hand by plane walls, such as 5 and 6, enclosing between them an angle of 22.5°, the plane bisecting this angle coinciding with an axial plane of the said conical surface, in such manner that the wall 5 of one post is parallel to the wall 6 of the nearest upright. The different walls 5 and 6 delimit, with the rings 2 and 3, eight lodgments or compartments such as 7 (FIG. 1).

Figure 3:
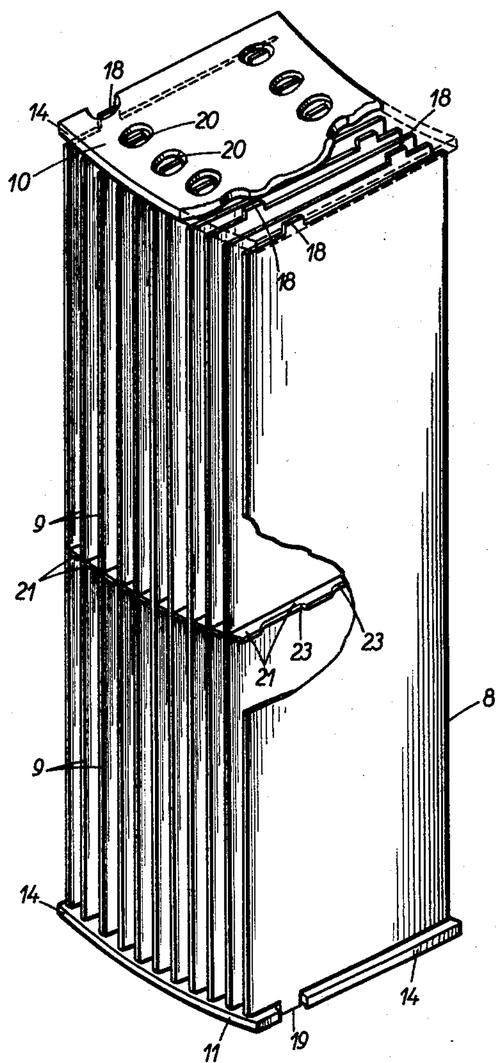
FIGURE 3 is a perspective view, with parts broken away, of a portion of the mould in FIGURES 1 and 2.

In each of these lodgments is introduced a sliding section 8 in the form of a set such as is represented in FIGURE 3. This set comprises eleven plates of sheet metal, such as 9, introduced into grooves formed in supports 10 and 11, having a form corresponding to that of the upper and lower faces of the lodgments 7.

Figure 2:
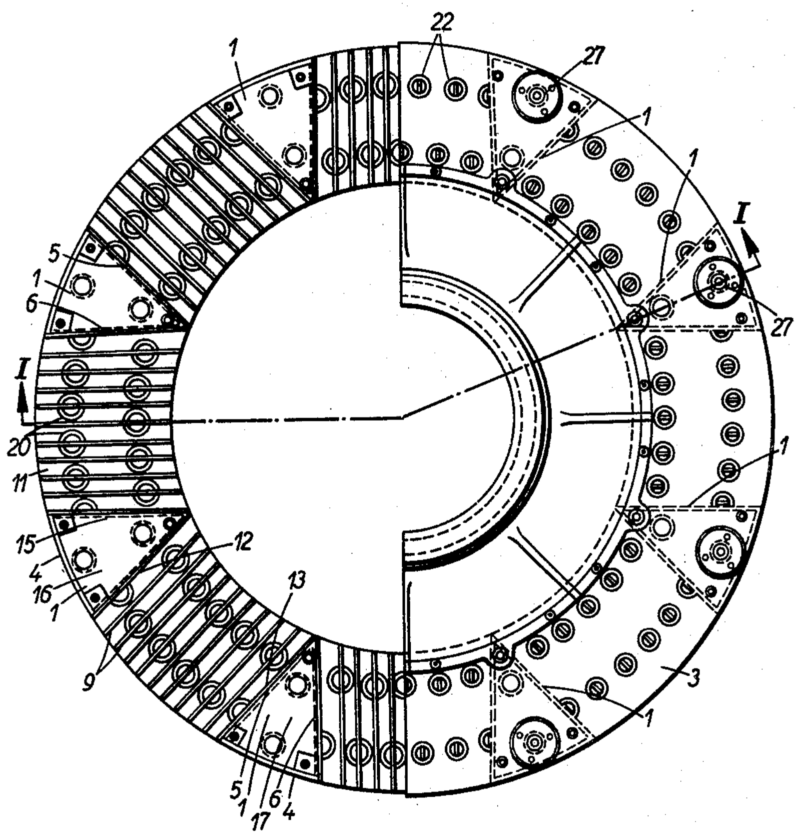
FIGURE 2 is a plan view, partially in section on the line II–II of FIGURE 1.

The supports 10 and 11 present projections 14 which slide, during the introduction or removal of the set concerned, in corresponding grooves 15 (FIG. 2) formed in the extremities 16 and 17 of the posts 1.

In order to avoid displacement of the plates 9 during use, each plate is furnished with two tenons 18 and 19 which engage in holes 20 formed in the supports 10 and 11, but not so as to project through to the external surface of such supports. Each plate 9, with the exception of the one in the middle, carries a bracing such as 21, in such manner that, in each section, it is possible to mould two series of slabs of sugar.

Holes 22, corresponding to the holes 20, are formed in the rings 2 and 3. The holes 20 and 22 not being completely closed, and some notches such as 23 being formed in the bracings 21, the liquid mass of sugar can penetrate through the holes into all the spaces available for the formation of slabs of sugar.

The holes 20 and 22 being provided not only in the upper part but also in the lower part, the filling of the mould can be performed by lowering it into a vat already filled with the liquid mass up to a determined level.

Owing to the arrangements provided, the plates 9 can be easily mounted and dismounted; it suffices to remove one of the supports 10 or 11.

The mould is surmounted by a dome 24 (FIGURE 1) presenting an external rim or flange 25 which serves to provide an engagement surface for a lifting apparatus. Another flange or rim 26, which is internal, is also useful in providing a supporting surface for the mould in a mould-discharging machine. Positioning studs or rollers 27 are provided on the ring 3, in order to be able to give mechanically to the mould desired angular positions, notably in the mould-removal operation.

It should be understood that the invention is not limited to the construction described and that modifications can be introduced, without departing from the scope of the present invention.

I claim:

1. A mould for the production of slabs of sugar according to the Adant process, this mould comprising an upper ring, a lower ring, peripherically spaced posts of triangular cross-section, said posts connecting said upper and lower rings, peripherical lodgments defined by portions of said rings and walls of two following ones of said posts, said walls being parallel, parallel-plate groups, the cast boiled mass of sugar being congealed by cooling between said parallel plates, and removable upper and lower supports between which are mounted said parallel-plate groups so as to form detachable sets, the number of plates in each one of said sets being equal to the number of slabs of sugar plus one, each set being engageable and removable in said lodgments by sliding in a radial direction.

2. A mould as claimed in claim 1, wherein each of the said supports comprises at least one projection corresponding with a corresponding groove in a post.

3. A mould as claimed in claim 1, wherein each plate is provided with one tenon which is engaged in a hole in a support when the plate is mounted between its supports.

4. A mould as claimed in claim 3, wherein the edges of the plates are engaged in grooves formed in the supports.

5. A mould as claimed in claim 4, wherein holes corresponding to the said holes in the supports are formed in the said rings, the said tenons leaving free a part of the holes in the supports so that the liquid mass to be cast can penetrate between the said plates through the various holes.

References Cited in the file of this patent

UNITED STATES PATENTS

| | | |
|---|---|---|
| 155,104 | Ockershousen | Sept. 10, 1874 |
| 211,797 | Seyferth | Jan. 28, 1879 |
| 278,110 | Duncan | May 22, 1883 |
| 616,679 | May | Dec. 27, 1898 |

OTHER REFERENCES

Sugar, by Fairrie, 1st ed., 1925, pp. 102–103.